US011282254B2

(12) United States Patent
Noh et al.

(10) Patent No.: US 11,282,254 B2
(45) Date of Patent: Mar. 22, 2022

(54) FULL-BODY MODELING METHOD AND APPARATUS BASED ON MODEL PREDICTIVE CONTROL WITH VISUOMOTOR SYSTEM

(71) Applicant: KOREA ADVANCED INSTITUTE OF SCIENCE AND TECHNOLOGY, Daejeon (KR)

(72) Inventors: Junyong Noh, Daejeon (KR); Haegwang Eom, Daejeon (KR); Daseong Han, Daejeon (KR); Sung Yong Shin, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/940,530

(22) Filed: Jul. 28, 2020

(65) Prior Publication Data

US 2021/0304476 A1    Sep. 30, 2021

(30) Foreign Application Priority Data

Mar. 31, 2020    (KR) .................. 10-2020-0039280

(51) Int. Cl.
*G06T 13/40* (2011.01)
*G06N 7/00* (2006.01)
*G06F 3/01* (2006.01)
*G06T 17/10* (2006.01)

(52) U.S. Cl.
CPC .............. *G06T 13/40* (2013.01); *G06F 3/013* (2013.01); *G06N 7/005* (2013.01); *G06T 17/10* (2013.01)

(58) Field of Classification Search
CPC ..................................................... G06T 13/40
See application file for complete search history.

(56) References Cited

PUBLICATIONS

Sang Hoon Yeo, Martin Lesmana, Debanga R. Neog, and Dinesh K. Pai. 2012. Eyecatch: simulating visuomotor coordination for object interception. ACM Trans. Graph. 31, 4, Article 42 (Jul. 2012), 10 pages (Year: 2012).*
Josh Merel, Arun Ahuja, Vu Pham, Saran Tunyasuvunakool, Siqi Liu, Dhruva Tirumala, Nicolas Heess, & Greg Wayne. (2019). Hierarchical visuomotor control of humanoids (Year: 2019).*
Eom, Haegwang, et al. "Model Predictive Control with a Visuomotor System for Physics-Based Character Animation," ACM Transactions on Graphics (TOG), Oct. 2019, Article No. 3. https://doi.org/10.1145/3360905.

* cited by examiner

*Primary Examiner* — Shivang I Patel
(74) *Attorney, Agent, or Firm* — Meunier Carlin & Curfman LLC

(57) ABSTRACT

Provided is a full-body modeling method and apparatus based on new model predictive control (MPC) with a visuomotor system in which visual perception and full-body motion control are integrated. The full-body modeling method includes determining a partial observation value associated with a state of an object based on a point of sight of a character, estimating the state of the object using the determined partial observation value based on a partially observable Markov decision process (POMDP), controlling a state of the character based on the estimated state of the object, and visualizing a motion of the character.

19 Claims, 4 Drawing Sheets

FULL-BODY MODELING METHOD AND APPARATUS BASED ON MODEL PREDICTIVE CONTROL WITH VISUOMOTOR SYSTEM

CROSS-REFERENCE TO RELATED APPLICATION(S)

This application claims the priority benefit of Korean Patent Application No. 10-2020-0039280 filed on Mar. 31, 2020, in the Korean Intellectual Property Office, the disclosure of which is incorporated herein by reference for all purposes.

BACKGROUND

1. Field

One or more example embodiments relate to model predictive control (MPC) using a visuomotor system in which visual perception and motion control are integrated.

2. Description of Related Art

Physics-based simulation has been widely used in character animation. Such an approach may enhance physical realism in character motion and facilitate convincing responses to environmental changes. Recent studies on this topic have dealt with physically valid interactions between a character and external objects in an online manner. Most of these studies assumed that a character accesses all information necessary to interact with objects, for example, precise trajectories. However, this often leads to unrealistic behaviors that humans would not exhibit in real life. For example, a character would avoid an unseen ball flying from behind, which may not be achieved by humans in real life. Thus, there is a desire for a new motion synthesis framework that couples physics-based simulation with visual perception.

In general, a visuomotor coordination entails essential secondary behaviors such as head and eye movements to adjust visual attention. For example, an observer pays attention to nearby obstacles while walking, to avoid a collision by turning the head and eyes toward these. To reflect such human behaviors, there is a desire for a physics-based motion synthesis technology for a full-body character, along with visual perception modeling. To this end, there is a desire for research on a technology for controlling a motion of a character that is induced in estimated environment states under uncertainty, as in a human behavior conducted based on information with uncertainty that is instantaneously collected through eyes.

The above description has been possessed or acquired by the inventor(s) in the course of conceiving the present disclosure and is not necessarily an art publicly known before the present application is filed.

SUMMARY

An aspect provides a technology for synthesizing a full-body motion of a character that naturally interacts with an external object based on partial observation information on an environment.

Another aspect provides a technology for controlling a motion of a character that interacts with objects in an environment state under uncertainty that is estimated based on a partial observation value from visual perception.

According to an example embodiment, there is provided a full-body modeling method including determining a point of sight of a character based on an eye pose of the character, determining an observation value and observation noise of the character with respect to at least one object based on the determined point of sight of the character, estimating a state of the object based on the determined observation value and the determined observation noise, generating a control policy of the character based on the estimated state of the object, a state of the character, and a reference motion of the character, and updating the state of the character based on the estimated state of the object and the generated control policy. The state of the character may include a state of at least one joint included in the character and the eye pose of the character.

The estimating of the state of the object may include estimating the state of the object based on a partially observable Markov decision process (POMDP).

The estimating of the state of the object may include defining a belief state of the object as a probability distribution over underlying states of the object based on the observation value and the observation noise associated with the object, and updating the belief state of the object based on a Kalman filter.

The updating of the belief state of the object may include predicting a next belief state of the object based on a transition matrix of the Kalman filter, and updating the predicted next belief state of the object based on the observation value associated with the object and a Kalman gain matrix of the Kalman filter that is associated with the object.

The eye pose may include at least one parameter including an azimuthal angle and a polar angle that indicate a gaze direction, and a focal length.

The at least one parameter including the azimuthal angle, the polar angle, and the focal length may be limited to a preset range.

The generating of the control policy may include determining a state of the object and a state of the character that correspond to a second time step which is a subsequent time step of a first time step based on a preset cost in a state of the object and a state of the character that correspond to the first time step, obtaining a character control vector corresponding to the first time step based on the state of the character corresponding to the second time step, and generating the character control vector for each of a preset number of time steps.

The preset cost may include at least one of a cost associated with the reference motion and the state of the joint included in the character, a cost associated with the character control vector, a cost associated with the belief state of the object, a cost associated with the eye pose of the character, or a cost associated with a type of a task performed by the character.

The control policy may include a character control vector that determines the state of the joint included in the character and the eye pose of the character.

The determining of the point of sight of the character may include determining the point of sight of the character based on a position of a head joint of the character, a position of a midpoint between two eyes of the character, a focal length, a degree of rotation of the head joint, and a degree of rotation of the midpoint between the two eyes.

The determining of the observation value and the observation noise of the character with respect to the object based on the point of sight of the character may include determining the observation noise based on the point of sight of the character and a position of the object, and determining the observation value of the character with respect to the object based on the position of the object and the observation noise.

The full-body modeling method may further include modeling a full-body character by visualizing the state of the character.

The state of the joint may include a position of the joint and a velocity of the joint.

According to another example embodiment, there is provided a full-body modeling apparatus including at least one processor configured to determine a point of sight of a character based on an eye pose of the character, determine an observation value and observation noise of the character with respect to at least one object based on the determined point of sight, estimate a state of the object based on the determined observation value and observation noise, generate a control policy of the character based on the estimated state of the object, a state of the character, and a reference motion of the character, and update the state of the character based on the estimated state of the object and the generated control policy, and a memory configured to store the state of the character, the reference motion of the character, and the state of the object. The state of the character may include a state of at least one joint included in the character, and the eye pose of the character.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
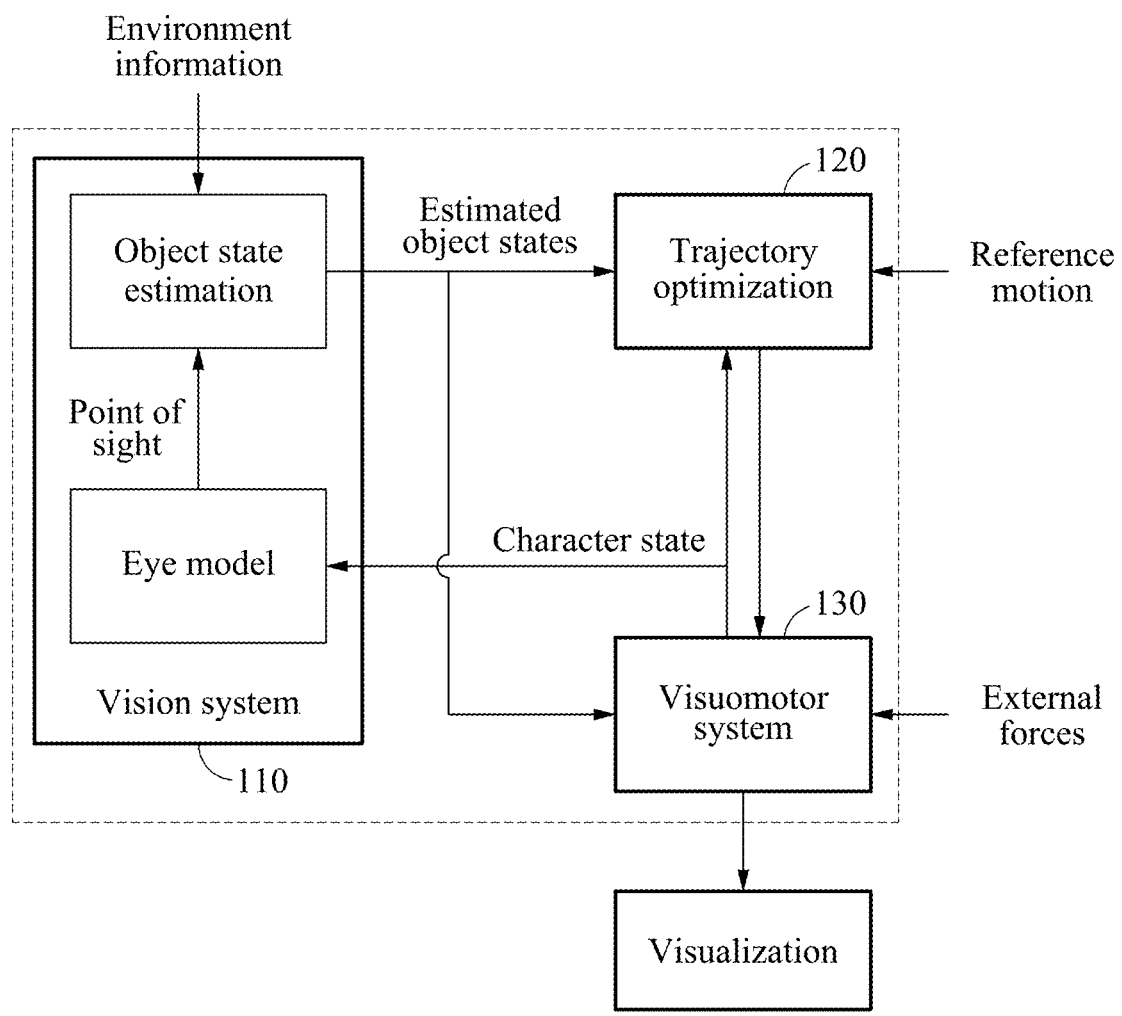
FIG. 1 illustrates an example of a system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples. In addition, when an element, such as a layer, region, or substrate, is described as being "on," "connected to," or "coupled to" another element, it may be directly "on," "connected to," or "coupled to" the other element, or there may be one or more other elements intervening therebetween.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Also, in the description of embodiments, detailed description of well-known related structures or functions will be omitted when it is deemed that such description will cause ambiguous interpretation of the present disclosure.

Hereinafter, $\dot{X}$, $\bar{X}$, and $\check{X}$ will be indicated as $\hat{}X$, $^-X$, and $\check{}X$, respectively.

According to an example embodiment, there is provided a new model predictive control (MPC)-based framework using a visuomotor system in which visual perception and full-body motion control are integrated. Through the visuomotor system, it is possible to synthesize a full-body motion of a character that may naturally interact with an external object based on partial information on an environment. However, a control issue of the integrated visuomotor system may lead to a partially observable Markov decision process (POMDP) because a certain action or behavior of the character occurs in an estimated environment state with uncertainty. The term "full-body" used herein refers to an entire body, and the term "character" used herein may indicate a full-body character.

For elaborate adjustment between a vision system and full-body dynamics, a physically suitable full-body motion may be synthesized, and an environment may be observed through the vision system that induces eye and head movements.

Effective control of the visuomotor system may be based on the POMDP. The POMDP may be modeled as an observable belief Markov decision process (MDP) using a Kalman filter that mimics a human action or behavior in tracking objects under uncertainty, and trajectory optimization for the visuomotor system may be performed by making belief update deterministic.

In addition, the vision system that may more faithfully reflect characteristics of human eyes using focal length adjustment, saccades (rapid eye movements), and pursuits (smooth eye movements) may be used.

System Overview

FIG. 1 illustrates an example of a system according to an example embodiment.

Referring to FIG. 1, a system includes a vision system 110, a trajectory optimizer 120, and a visuomotor system 130.

When a state of a full-body character including an eye pose is given from a visuomotor system, a vision system may determine a point of sight of the character, and estimate states of perceived objects by approximating belief dynamics of a POMDP using a Kalman filter to track noisy perceived states of external objects. Here, an estimated state of each object may include its position and velocity together with uncertainty. Using such an estimated state of each object, a trajectory optimizer may generate a locally optimal control policy that adjusts a full-body motion, eye and head movements, and a focal length, guided by a reference motion.

To discover a control policy of the full-body character, differential dynamic programming (DDP) may be adopted. To support an online interactive performance, a system according to an example embodiment may repeatedly update such a character control policy for a short time window while shifting it along a time axis.

When the control policy is given along with an external force, the visuomotor system may perform a forward dynamics simulation to update the state of the full-body character.

An object state and a character state may be determined based on a time step. The object state may indicate and be interchangeably referred to as a state of an object, and the character state may indicate and be interchangeably referred to as a state of a character. For example, when a current object state and a current character state correspond to a first time step, a next object state or a next character state may correspond to a second time step which is a subsequent time step of the first time step.

Vision System

Eye Model

Figure 2:
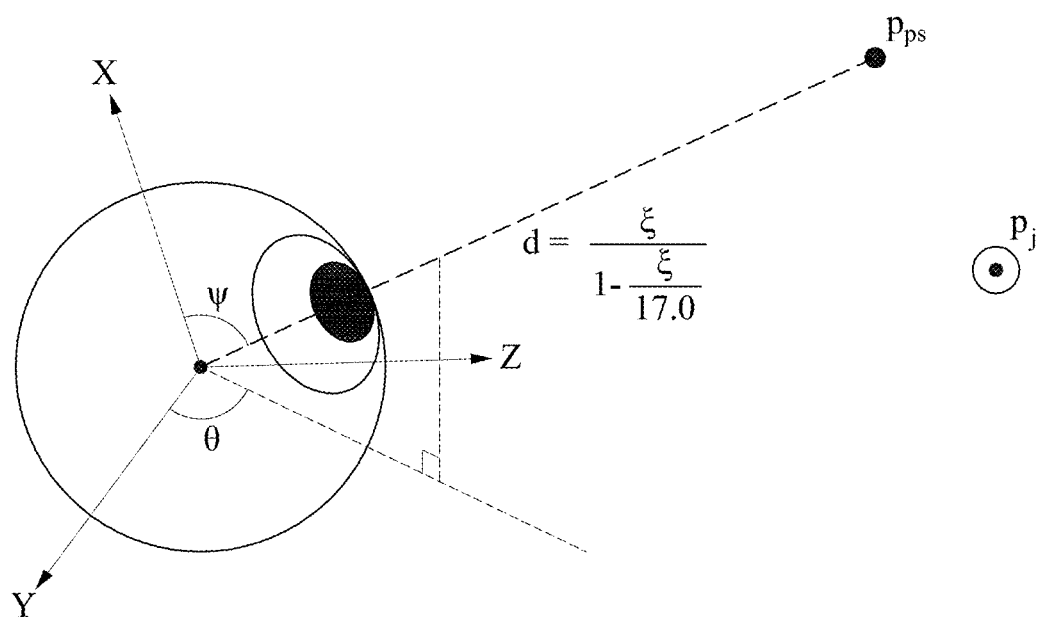
FIG. 2 illustrates an example of an eye frame according to an example embodiment.

Referring to FIG. 2, an eye frame may be defined using a spherical coordinate system. In the frame, an eye pose, $e=[\theta, \psi, \zeta]^T$, may be specified using three parameters. Here, $\theta$ and $\psi$ respectively denote an azimuthal angle and a polar angle, which represent a gaze direction, and $\zeta$ denotes a focal length.

Each of the parameters may be set in a normal eye movement range that may be obtained from medical research. For example, $-44.2°\leq\theta\leq44.2°$ for abduction and adduction, $-47.1°\leq\psi\leq27.7°$ for depression and elevation, and $0.0\leq\zeta\leq17.0$ millimeters (mm) for focal length. For example, when a human looks at a point at infinity, the focal length approaches 17.0 mm.

In addition, there may be a limit set on an eye movement to generate realistic gaze behaviors, for example, saccades (which refer to rapid eyeball movements) and pursuits (which refer to slow or smooth eyeball movements), which are important characteristics of human eyes. The system according to an example embodiment may set a velocity limit for a natural gaze behavior. For example, the system may set a maximum saccade speed to 800°/s and a maximum pursuit speed to 100°/s, considering only azimuthal and polar eyeball movements. In this example, the saccades may repeat in every 200 milliseconds (ms) interval, each followed by a 200 ms pause for recharge. In addition, the pursuits may occur simultaneously even during the recharge for the saccades. Such a limit on an eye movement may be incorporated in the vision system as follows: $\|\dot{e}_{\theta,\psi}\|\leq B$.

Here, $\dot{e}_{\theta,\psi}$ denotes an eyeball speed for azimuthal and polar movements, and B denotes an upper limit of its magnitude.

Point of Sight

A point of sight $p_{ps}$ may play a key role in integrating full-body dynamics with the vision system because it is a function of a joint position q and an eye pose e of a full-body character. It is defined as follows: $p_{ps}(q,e)=p_{head}(q)+W_{head}(q)p_{eye}d(e)\hat{z}(q,e)$.

Here, $p_{head}$ and $W_{head}$ respectively denote a position and a rotation matrix of a head with respect to a global frame. In addition, $p_{eye}$ denotes a midpoint between two eyes with respect to a head frame, and $d(e)=\zeta/(1-\zeta/17.0)$ is a distance between $p_{eye}$ and a point of sight. $\hat{z}$ denotes a unit vector indicating a gaze direction, that is, a z-axis extracted from a matrix $W_{eye}(e)W_{head}(q)$. $W_{eye}$ denotes a rotation matrix of $p_{eye}$ with respect to the head frame.

Object State Estimation

Hereinafter, a method of estimating a state of an object through a partial observation of the object will be described. To generate a realistic gaze behavior, a human vision system may be imitated by estimating an object state under uncertainty, instead of using a true full object state.

Under the assumption that a character does not know a true object state, the system may observe the true object state. To construct an observation model that abstracts human visual sensors, it is assumed that a human is able to perceive positional information of a moving object and estimate a velocity of the object instantaneously. In addition, it is assumed the perceived positional information is not accurate in general, and the positional information is inaccurate particularly when the object is farther from a point of sight. Under such assumptions, the observation model of the vision system may be defined as represented by Equation 1 below.

$$z_j = p_j + \rho = Hx_j + \rho, \quad \text{where}$$
$$H = [I O], \rho \sim \mathcal{N}(0, R_j), \quad \text{and}$$
$$R_j = r_j * I, \quad \text{where}$$
$$r_j = \left(1 - e^{\frac{-\|p_{ps}-p_j\|}{2\eta}}\right).$$

[Equation 1]

When $N_{obj}$ is the number of objects in an environment perceived by the vision system, the observation model may generate a partial observation $z_j$ on an object state from a true object state $x_j=[p_j^T v_j^T]^T$ that includes a position $p_j$ and a velocity $v_j$ of an object $j=0, 1, \ldots, N_{obj}-1$, considering observation noise $\rho$. In addition, H denotes a transformation matrix that maps an object state onto a noise-free partial observation, that is, an object position. The observation noise $\rho$ may have a multivariate Gaussian distribution with a covariance $R_j$. In addition, $\eta$ denotes a constant for a fovea size. The covariance matrix $R_j$ may be a diagonal matrix in which values of diagonal elements are determined by a Euclidean distance between a point of sight $p_{ps}$ and the object position $p_j$. Here, as a point of sight of a character is farther from the object, an error of the observed object position may increase.

Under the assumption that a brain has prior knowledge about dynamics of an object, a process model that deals with the evolution of an object state may be formulated as represented by Equation 2 below.

$$x'_j = Fx_j + y + \delta, \text{ where} \quad \text{[Equation 2]}$$
$$F = \begin{bmatrix} I & hI \\ O & I \end{bmatrix}, y = \begin{bmatrix} O \\ ha \end{bmatrix}, \text{ and}$$
$$\delta \sim \mathcal{N}(0, Q).$$

In Equation 2, $x'_j$ denotes a next state of an object j. F denotes a state transition matrix. y denotes a control vector. h denotes a time difference between two consecutive observations, and a denotes a gravitational acceleration. In addition, $\delta$ denotes process noise with a covariance $Q=\alpha I$, in which a is a nonnegative constant and Q denotes brain's own uncertainty of the process model. A large value of a may make the uncertainty of an estimated object state tend to grow rapidly as the point of sight becomes farther from the object. This may make the character move the point of sight back to the object whenever the uncertainty of the estimated object state grows sufficiently large. By varying this coefficient, it is possible to adjust a capability of the vision system in terms of, for example, a time for which the character looks at an object, or a time at which a gaze is switched from one object to another object when there is a plurality of objects.

The vision system may estimate an object state based on a partial observation of a true object state. Thus, an optimal control issue for this model may lead to a POMDP, where an underlying state of an object is partially known. The POMDP may be converted to a belief MDP by introducing a probability distribution over underlying object states, known as a belief state, together with a transition function from one belief state to another belief state, which is described as a belief update. The resulting belief MDP may be a variant of a standard MDP, which takes into account belief states instead of underlying object states. Here, using a Kalman filter, the belief update may be estimated as a Gaussian update based on a partial observation on an external object in an environment.

A Gaussian distribution, that is, $b(x_j)=N(\mu_j, \Sigma_j)$, where a mean $\mu_j$ and a covariance $\Sigma_j$ may be regarded as an estimated state and estimation uncertainty, respectively, may define a belief state b over underlying states of an external object. When a current belief state b and a current observation $z_j$ are given, the vision system may estimate a next belief state $b'(x_j)$ through a belief update $n(b, z_j)$ based on the Kalman filter given in Equations 1 and 2 above. The next belief state $b'(x_j)$ may be represented as $b'(x_j)=n(b, z_j)=N(\mu'_j, \Sigma'_j)$, where $\mu'_j$ and $\Sigma'_j$ denote a new mean and a new covariance at a next time step, respectively, and may be defined as represented by Equations 3 and 4, respectively.

$$\mu'_j = F\mu_j + y + K_j(z_j - H(F\mu_j + y)) \quad \text{[Equation 3]}$$

$$\Sigma'_j = (I - K_jH)(F\Sigma_jF^T + Q) \quad \text{[Equation 4]}$$

In Equations 3 and 4 above, $K_j = (F\Sigma_jF^T+Q)H^T(H(F\Sigma_jF^T+Q)H^T+R_j)^{-1}$, which is a Kalman gain for an object j and determines how much a current observation affects a next belief state. The belief state b may be used for trajectory optimization to be described hereinafter. Hereinafter, $$\sum_j = \begin{bmatrix} \sigma^p_j I & \sigma^{pv}_j I \\ \sigma^{pv}_j I & \sigma^v_j I \end{bmatrix}$$

will be represented as a three-dimensional (3D) vector $\sigma_j = [\sigma^p_j \ \sigma^v_j \ \sigma^{pv}_j]T$.

Based on Equations 1 and 2 above, the system may perform the belief update through prediction and update steps of the Kalman filter. When a current belief state, $b(x_j)=N(\mu_j, \Sigma_j)$, is given for an object j, the prediction step may produce a priori belief estimate $\bar{b}(x_j)=N(\bar{\mu}_j, \bar{\Sigma}_j)$, where $\bar{\mu}_j$ and $\bar{\Sigma}_j$ are defined as represented below.

$$\bar{\mu}_j = F\mu_j = y \text{ and}$$

$$\sum_j = F\sum_j F^T +$$
$$Q = \begin{bmatrix} (\sigma^p_j + h\sigma^{pv}_j + h(\sigma^{pv}_j + h\sigma^v_j) + \alpha)I & (\sigma^{pv}_j + h\sigma^v_j)I \\ (\sigma^{pv}_j + h\sigma^v_j)I & (\sigma^v_j + \alpha)I \end{bmatrix} = \begin{bmatrix} \bar{\sigma}^p_j I & \bar{\sigma}^{pv}_j I \\ \bar{\sigma}^{pv}_j I & \bar{\sigma}^v_j I \end{bmatrix}$$

By combining an observation $z_j$ at a current time step with a priori belief estimate predicted as described above, the update step may lead to a posteriori belief estimate, that is, a belief update $b'(x_j)=N(\mu'_j, \Sigma'_j)$, where $\mu'_j$ and $\Sigma'_j$ are defined as represented below.

$$\mu'_j = \bar{\mu}_j + K_j m_j \text{ and } \Sigma'_j = (I - K_jH)\bar{\Sigma}_j$$

In the equations above, $m_j$ and $K_j$ denote an observation residual and a Kalman gain for each object, respectively, which are derived as represented below.

$$m_j = z_j - H\bar{\mu}_j = z_j - H(F\mu_j + y)$$

$$K_j = \bar{\Sigma}_j H^T S_j^{-1},$$

Here, $S_j$ denotes a residual covariance, which is derived as represented below.

$$S_j = H\bar{\Sigma}_j H^T + R_j = H(F\Sigma_jF^T + Q)H^T + R_j$$

Therefore, $\mu'_j$ and $\Sigma'_j$ are as follows.

$$\mu'_j = \bar{\mu}_j + K_j m_j = F\mu_j + y + K_j(z_j - H(F\mu_j + y)),$$

$$\Sigma'_j = (I - K_jH)\bar{\Sigma}_j = (I - K_jH)(F\Sigma_jF^T + Q).$$

Visuomotor System

Hereinafter, full dynamics of the visuomotor system that governs the evolution of a character state using an estimated object state and a character control vector will be described. According to a related art, stable articulated-body dynamics may be adopted as represented below.

$$M(\dot{q}' - \dot{q}) = h\left(\begin{bmatrix} 0 \\ \tau \end{bmatrix} - \phi - B\dot{q}\right) + J^T \hat{f},$$

where $M=M_0+M_a+hB$.

Here, M denotes a total mass matrix. $\dot{q}$ and $\dot{q}'$ denote a joint velocity at a current step and a joint velocity at a next step, respectively. h denotes an integration step size. $\tau$ denotes an actuated joint torque, and $\phi$ denotes a bias force resulting from the gravity, Coriolis forces, and external forces if there is any. $B=k_d I$ is a damping gain matrix having a constant $k_d$, and J denotes a kinematic Jacobian matrix at a contact point on which a contact impulse $\hat{f}$ is exerted. $M_0$ denotes a plain mass matrix, and $M_a=\rho_a I$ indicates an armature inertia matrix with a coefficient $\rho_a$.

In addition, $x_{fb}=[q^T \ \dot{q}^T]^T$ and $u_{fb}=\tau$ indicate a full-body character state and a full-body character control vector, respectively. Here, q denotes a full-body joint position. In detail, the full-body model $x_{fb}$ that consists of hinge joints for elbow and knee joints and of ball joints for other joints may have a 40 degrees of freedom (DoF), excluding eyeball parameters, and Lift, may have a 34 DoE The full-body system dynamics for a character may be derived by employing a semi-implicit Euler integration as follows.

$$x'_{fb} = l(x_{fb}, u_{fb}) = \begin{bmatrix} q + h\dot{q}' \\ \dot{q}' \end{bmatrix}, \text{ where}$$

$$\dot{q}' = \dot{q} + hM^{-1}\left(\begin{bmatrix} 0 \\ \tau \end{bmatrix} - \phi - B\dot{q}\right) + M^{-1}J^T\hat{f}.$$

Here, the contact impulse $\hat{f}$ may be calculated or computed based on smoothed contact dynamics according to a related art.

By combining the full-body dynamics and the belief update, it is possible to obtain system dynamics for the visuomotor system.

$$x' = g(x, u, z) = \begin{bmatrix} l(x_{fb}, u_{fb}) \\ e + h\dot{e} \\ \mu' \\ \sigma' \end{bmatrix}$$

Here, $x = [x_{fb}^T \ e^T \ \mu^T \ \sigma^T]^T$ and $u = [u_{fb}^T \ \dot{e}^T]^T$ indicate a state vector and a control vector, respectively. $\dot{e}$ denotes a time derivative of an eye pose $e$. For other symbols in the system dynamics equation, reference may be made to Equations 3 and 4. The first two rows of the system dynamics are responsible for updating a full-body character state and an eye pose, and the last two rows are responsible for updating a current belief state. These may model a visual perception process for an external object based on a partial observation $z_j$. In the framework according to an example embodiment, a mean $\mu_j$ of a current belief state may be used as an estimate of a perceived object state.

Trajectory Optimization

To search for a locally optimal control policy for the visuomotor system, DDP may be adopted using a short time window.

The DDP is, however, mainly used for deterministic systems with nonlinear system dynamics Thus, the visuomotor system dynamics may be simplified further to handle an update function for a mean $\mu_j$, which is stochastic due to a noisy observation $z_j$. To obtain a deterministic mean update $\hat{\mu}'_j$, $\mu'_j$ may be approximated as represented below using a fact that Equation 3 is linear in $z_j$.

$$\mu'_j \approx \hat{\mu}'_j = E\{F\hat{\mu}_j + y + K_j(z_j - H(F\hat{\mu}_j + y))\} = F\hat{\mu}_j + y$$

The approximation $\hat{\mu}'_j$ may be equivalently obtained through a marginalizing belief update $n(\hat{b}(x_j), z_j)$ over an observation as represented below.

$$\int_{z_j} n(\hat{b}(x_j), z_j) dz_j = N(\hat{\mu}'_j, \Sigma'_j) \text{ where } \hat{b}(x_j) = N(\hat{\mu}_j, \Sigma_j)$$

This approximation may be applied only to trajectory optimization. In an actual simulation of the visuomotor system with an optimal policy, an estimated state may be updated using Equation 3 above. As observed in Equation 4, $\Sigma'_j$ may be independent of an observation $z_j$, and thus be simply updated according to Equation 4.

The approximation $\hat{\mu}'_j$ may result in a deterministic dynamics system for the DDP as represented below.

$$\hat{x}' = \hat{g}(\hat{x}, u) = \begin{bmatrix} l(x_{fb}, u_{fb}) \\ e + h\dot{e} \\ \hat{\mu}' \\ \sigma' \end{bmatrix}$$

Thus, a full-body state vector $x_{fb}$ may be extended to $\hat{x} = [x_{fb}^T \ e^T \ \hat{\mu}^T \ \sigma^T]^T$, where $\hat{\mu}'$ is a matrix obtained by juxtaposing all $\hat{\mu}'_j$. The state estimation update may be reduced to a deterministic version by taking a most-likely observation for $\mu$ (the third row), but uncertainty $\sigma'$ (the fourth row) for the object state estimation may remain unchanged. The resulting system dynamics may be regarded as a brain's internal model for the visuomotor system that is used to predict future full-body motions, eye movements, and belief states for external objects.

When a current state $\hat{x}$ and a reference skeletal trajectory $^-X = \{^-x_{fb}^i | i = 0, 1, \ldots, N-1\}$ are given, a finite-horizon optimal control problem for a control policy, $(u^0, u^1, \ldots, u^{N-2})$, over a discrete window of size N may be solved as represented below.

$$\min_{u^0, u^1, \ldots, u^{N-2}} \sum_{i=0}^{N-2} c(\hat{x}^i, u^i) + c_f(\hat{x}^{N-1}),$$

subject to $\hat{x}^0 = \hat{x}$, $\hat{x}^{i+1} = \hat{g}(\hat{x}^i, u^i)$ for $i = 1, \ldots, N - 2$.

Here, $c(\hat{x}^i, u^i)$ and $c_f(\hat{x}^{N-1})$ denote a cost function at an i-th time step and a cost function at a last time step, respectively. The cost function at each time step may be represented as below.

$$c(\hat{x}^i, u^i) = w_{trk}c_{trk} + w_{eng}c_{eng} + w_{uct}c_{uct} + w_{bnd}c_{bnd} + w_{tsk}c_{tsk}$$

Here, $w_i$ denotes a weight for a cost term $c_i$ where $i \in \{trk, eng, uct, bnd, tsk\}$. Each cost term will be described in detail hereinafter.

Cost for Tracking $c_{trk}$ denotes a cost for tracking a reference skeletal motion and an upper-body orientation, and may be defined as represented below.

$$c_{trk} = \|\hat{x}_{fb}^i - ^-x_{fb}^i\|^2 + \|^-o_{ub}^i - o_{ub}^i\|^2$$

Here, $o_{ub}^i$ denotes a displacement vector from a root to a head, and $^-o_{ub}^i$ denotes a corresponding reference vector. The first term may be for tracking the reference skeletal motion, and the second term may be for maintaining a torso up-vector as close to that of the reference motion as possible.

Cost for Energy Consumption $c_{eng}$ denotes a cost for preventing a character from generating an overly powerful actuation, and may be defined as represented below.

$$c_{eng} = \|u^i\|^2$$

This term may not be included in the cost function for the last step $c_f(\hat{x}^{N-1})$.

Cost for Uncertainty

To reduce the uncertainty of an estimated object state, a penalty may be given to a sum of magnitudes of covariance for a belief state of each perceived object as represented below.

$$c_{uct} = \sum_{j=0}^{N_{obj}-1} \|\sigma'_j\|^2$$

This term may play an important role in tracking an object state and generating a convincing secondary behavior including head and eye movements. In detail, the term may optimize a sum of squared diagonal elements of each observation covariance matrix $R_j$ defined in Equation 1, and then minimize a Euclidean distance $r_j$ between a point of sight $p_{ps}$ and each object position $p_j$. Thus, when there is only a single object in an environment, $p_{ps}$ may tend to move toward $p_j$ to minimize $r_j$, regardless of whether the object moves or not. In such a case, an observation of an object state by a character may be guaranteed to converge to its true state as it keeps looking at the object.

For example, where there is a single object in an environment, a character may keep looking at the object. Based on Equation 1, as a point of sight of a character approaches an object j, $r_j$ tends to become a zero, and thus $R_j$ may become a zero matrix. Thus, a limit of a Kalman gain $K_j$ may be derived as represented below.

$$\lim_{r_j \to 0} K_j =$$

$$\lim_{r_j \to 0} \sum_j H^T \left( H \sum_j H^T + R_j \right)^{-1} = \lim_{r_j \to 0} \left( \frac{1}{\sigma_j^p + r_j} \right) \begin{bmatrix} \sigma_j^p I \\ \sigma_j^{pv} I \end{bmatrix} = \begin{bmatrix} I \\ \frac{\sigma_j^{pv}}{\sigma_j^p} I \end{bmatrix}.$$

Using an obtained result above, a limit of $\mu_j$ in Equation 3 may be derived as represented below.

$$\lim_{r_j \to 0} \mu'_j = \lim_{r_j \to 0} (\bar{\mu}_j + K_j(z_j - H\bar{\mu}_j)) =$$

$$\bar{\mu}_j + \begin{bmatrix} I \\ \frac{\sigma_j^{pv}}{\sigma_j^p} I \end{bmatrix} (z_j - H\bar{\mu}_j) = \begin{bmatrix} p_j \\ \bar{\mu}_j^v + \frac{\sigma_j^{pv}}{\sigma_j^p} (p_j - \bar{\mu}_j^p) \end{bmatrix}.$$

As $r_j \to 0$, an estimated state may approach a true state in terms of a position but not in terms of a velocity. This may indicate that a true object position may be perfectly observed as $r_j \to 0$.

$\Sigma'_j$ in Equation 4 may also be reduced to the following equation.

$$\lim_{r_j \to 0} \sum_j{}' = \lim_{r_j \to 0} (I - K_j H) \sum_j =$$

$$\lim_{r_j \to 0} \begin{bmatrix} \left( \frac{\sigma_j^p r_j}{\sigma_j^p + r_j} \right) I & \left( \frac{\sigma_j^{pv} r_j}{\sigma_j^p + r_j} \right) I \\ \left( \frac{\sigma_j^{pv} r_j}{\sigma_j^p + r_j} \right) I & \left( \sigma_j^v - \frac{\sigma_j^{pv2}}{\sigma_j^p + r_j} \right) I \end{bmatrix} = \begin{bmatrix} 0 & 0 \\ 0 & \left( \sigma_j^v - \frac{\sigma_j^{pv2}}{\sigma_j^p} \right) I \end{bmatrix}.$$

Every submatrix tends to a zero as $r_j \to 0$, except for a velocity covariance matrix (the lower right submatrix of the last matrix). A norm of the velocity covariance matrix may also have a minimum value as $r_j \to 0$, since $$\sigma_j^v > \frac{\sigma_j^{pv2}}{\sigma_j^p + r_j}$$

for a positive constant α as represented below.

$$\sigma_j^v - \frac{\sigma_j^{pv2}}{\sigma_j^p + r_j} = (\sigma_j^v + \alpha) - \frac{(\sigma_j^{pv} + h\sigma_j^v)^2}{(\sigma_j^p + h\sigma_j^{pv} + h(\sigma_j^{pv} + h\sigma_j^v) + \alpha) + r_j} =$$

$$\alpha + \frac{\sigma_j^v(\alpha + r_j)}{(\sigma_j^p + h\sigma_j^{pv} + h(\sigma_j^{pv} + h\sigma_j^v + \alpha) + r_j} > 0$$

Therefore, $$\sigma_j^v > \frac{\sigma_j^{pv2}}{\sigma_j^p + r_j}.$$

In the third step of the above derivation, a fact that $\sigma_j^p \sigma_j^v = \sigma_j^{pv}$ in the Cauchy-Schwarz inequality may be used because an object velocity has a linear relationship with an object position. In a perfect process model in which a has a zero value, $$\sigma_j^v - \frac{\sigma_j^{pv2}}{\sigma_j^p}$$

may move to a zero. Thus, when a character keeps looking at an object, the vision system may match an observed object state to a true object position with a minimal uncertainty.

Although an example where a single object is present has been described above for the convenience of description, the terms may be used to simultaneously process multiple objects while moving a point of sight from one object to another object as needed.

Constraints for Eye Model

Spherical coordinates θ and ψ that represent an eyeball position and a focal length ζ may have respective upper and lower limits (or bounds) as described above. Similarly, an eyeball speed for an azimuthal movement and a polar movement may also have corresponding upper limits.

The upper and lower limits may be enforced with soft constraints as represented below.

$$c_{bnd} = \sum_{x \in \{\theta, \psi, \zeta\}} (smax(x^{hi} - x; \gamma) + smax(x - x^{lo}; \gamma)) + smax(\|\dot{e}_{\theta, \psi}\| - \mathcal{B}; \gamma).$$

Here, $x^{hi}$ and $x^{lo}$ denote an upper limit and a lower limit for each eyeball coordinates, respectively, and $smax(x; \gamma) = (\sqrt{x^2 + \gamma^2} - x)/2$ is a smoothed version of max (x, 0), which returns x if x>0 and zero otherwise. A coefficient γ may be used to adjust how much the function needs to be softened around x=0.

Cost for Task $c_{tsk}$ is a task-dependent cost term, and may be defined differently based on a type of a task.

Figure 3A:
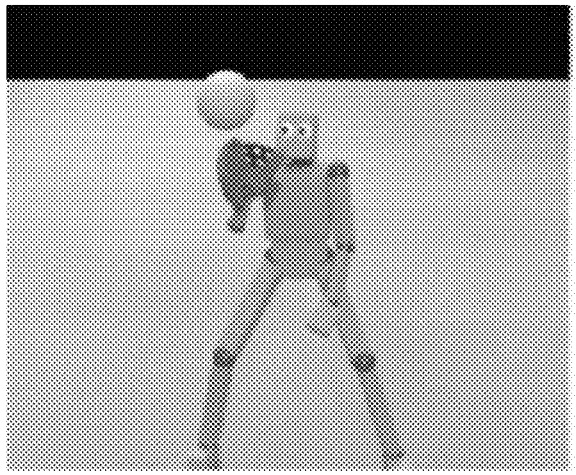
FIGS. 3A through 3D illustrate examples of types of tasks performed by a character according to an example embodiment.
Figure 3B:
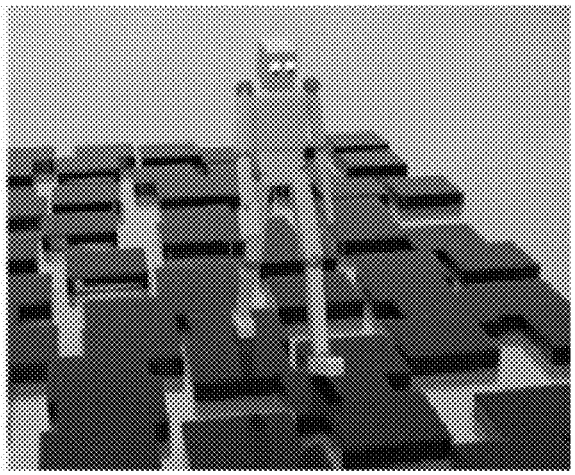
Figure 3C:
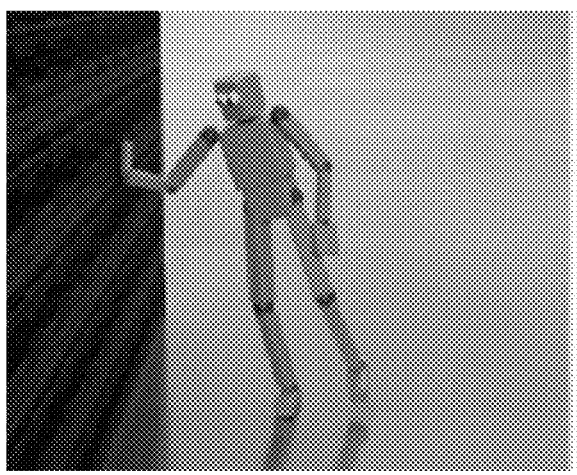
Figure 3D:
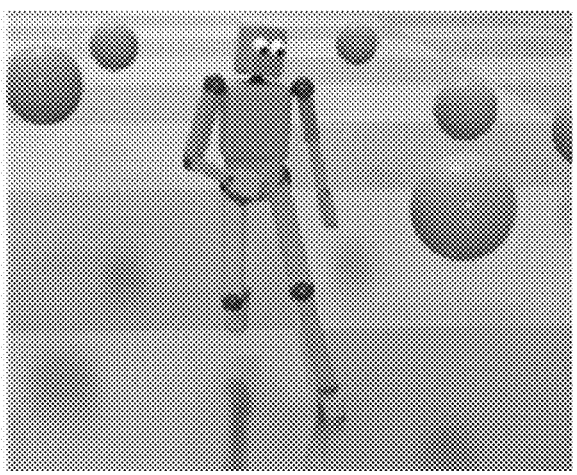

FIGS. 3A through 3D illustrate examples of types of tasks according to an example embodiment. FIG. 3A illustrates a ball-catching task, FIG. 3B illustrates a task of walking on stepping stones, FIG. 3C illustrates, a task of balancing after being pushed, and FIG. 3D illustrates a task of avoiding obstacles.

For example, in a case of a ball-catching task, a task-dependent cost term may be defined as $c_{tsk} = \|p_{hand} - p_{ball}\|^2 + \|p_{ball}^{lat} - p_{sp}^{lat}\|^2$, where $p_{hand}$ and $P_{ball}$ respectively denote a position of a hand catching a ball and an estimated arrival position of the ball based on a current character state and an estimated ball state. In addition, $p^{lat}_{ball}$ and $p^{lat}_{sp}$ respectively denote a lateral component of $p_{ball}$ and a midpoint of both feet approximating a center of a support polygon. The first term may be associated with moving the hand to the estimated arrival position of the ball, and the second term may be associated with moving the feet in a lateral direction if the arrival position is laterally far from a character.

For example, in a case of a task of walking on stepping stones, a task-dependent cost term may be defined as $c_{tsk}=\|p_{foot}-p_{cs}\|^2+\|W_{foot}-\overline{W}_{foot}\|^2$, where $p_{foot}$ denotes a position of a contact foot, and $p_{cs}$ denotes a position of a stone closest to the foot. $W_{foot}$ denotes a rotation matrix of the foot, and $\overline{W}_{foot}$ denotes a reference matrix corresponding to $W_{foot}$. $c_{tsk}$ may be applied only to a contact frame.

For example, in a case of a task of balancing after a push, a task-dependent cost term may not be used.

For example, in a case of a task of avoiding obstacles, a task-dependent cost term may $$c_{tsk} = \sum_{j=0}^{N_{obj}-1} \exp\left(\frac{-\|p_{root} - \hat{p}_j\|}{s_j^2}\right),$$

be defined as where $p_{foot}$ denotes a global root position of a character, and $\hat{p}_j$ denotes an estimated position of a j-th object, which is the first free components of $\hat{\mu}_j$. $s_j$ denotes a radius of the j-th object.

According to an example embodiment, the system may generate an optimal control policy that processes a gaze behavior that varies over time, in addition to a full-body motion, in order to minimize an object function including the cost terms described in the foregoing. In detail, the $c_{tsk}$ cost term may guide a full-body character to perform an intended task, and the $c_{uct}$ cost term may induce a secondary behavior driven by time-varying uncertainty of each object state. The system may synthesize the gaze behavior and the full-body motion to perform an intended task. Thus, the full-body motion synthesized by the system may be different from a motion that is explicitly directed by a task-only cost term.

Figure 4:
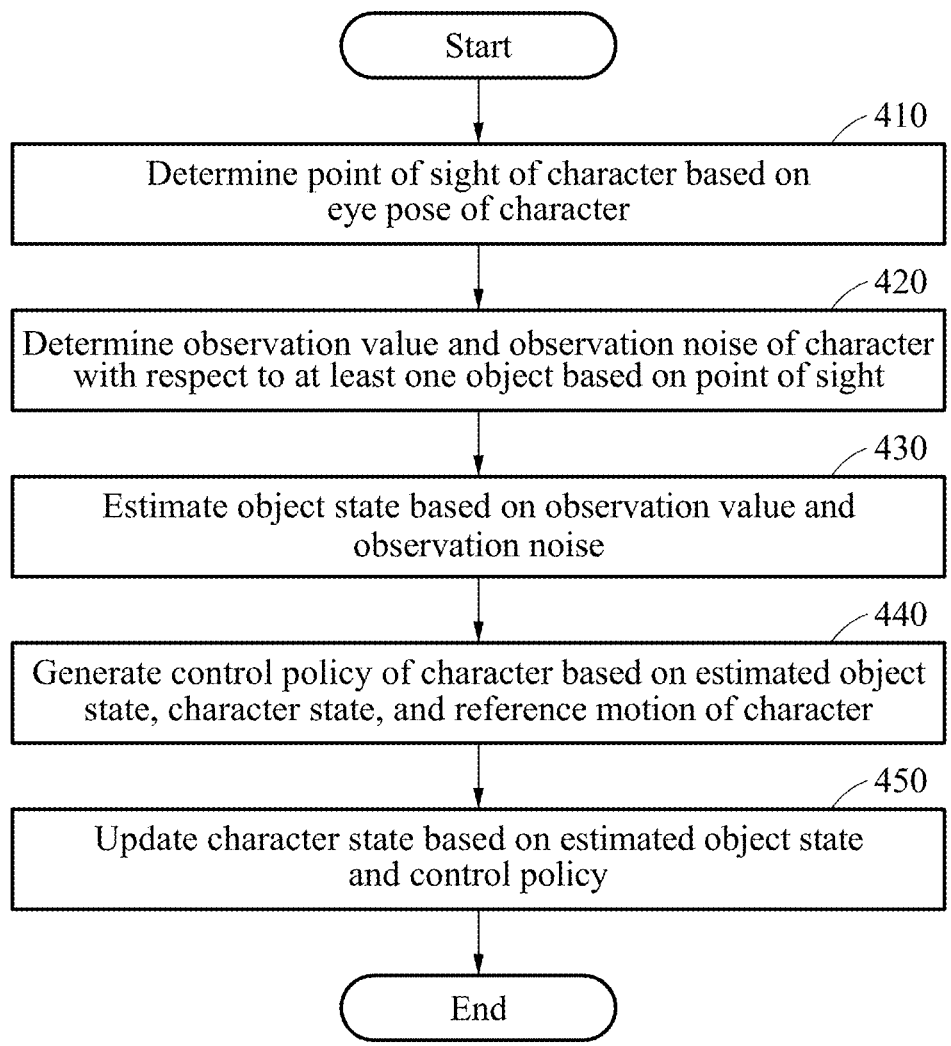
FIG. 4 illustrates a flowchart of an example of a full-body modeling method according to an example embodiment.

FIG. 4 illustrates a flowchart of an example of a full-body modeling method according to an example embodiment.

Referring to FIG. 4, a full-body modeling method includes operation 410 of determining a point of sight of a character based on an eye pose of the character; operation 420 of determining an observation value and observation noise of the character with respect to at least one object based on the determined point of sight; operation 430 of estimating a state of the object based on the determined observation value and observation noise; operation 440 of generating a control policy of the character based on the estimated state of the object, a state of the character, and a reference motion of the character; and operation 450 of updating the state of the character based on the estimated state of the object and the generated control policy. Hereinafter, the state of the object will also be referred to as an object state, and the state of the character will also be referred to as a character state.

The character may include at least one joint, and the character state may include a state of the joint and the eye pose of the character.

In operation 410, the eye pose of the character may correspond to an eye pose of an eye model, for example, $e=[\theta, \psi, \zeta]^T$. That is, the eye pose of the character may include parameters such as an azimuthal angle and a polar angle that indicate a gaze direction, and a focal length. Each of the parameters may be limited in a preset range. For example, each parameter value may be limited to a normal eye movement range that may be obtained from medical research. For example, $-44.2°\leq\theta\leq44.2°$ for abduction and adduction, $-47.1°\leq\psi\leq27.7°$ for depression and elevation, and $0.0\leq\zeta\leq17.0$ mm for focal length.

In operation 410, a point of sight $p_{ps}$ may be determined based on a function of a joint position q and an eye pose e, that is, $p_{ps}(q, e)=p_{head}(q)+W_{head}(q)p_{eye}\,d(e)\hat{z}(q, e)$. That is, the point of sight of the character may be determined based on a position $p_{head}(q)$ of a head joint of the character, a position $p_{eye}$ of a midpoint between two eyes of the character, the focal length $\zeta$, a rotation degree $W_{head}(q)$ of the head joint, and a rotation degree $W_{eye}(q)$ of the midpoint between the two eyes.

In operation 420, the observation value of the character with respect to the object may correspond to a partial observation described above. That is, the observation value associated with the object may be an observed value of each of states of $N_{obj}$ objects present in an environment. Here, $N_{obj}$ is an integer greater than or equal to 1. Thus, a partial observation $z_j$ associated with an object j may be $z_j$ (j=0, 1, . . . , $N_{obj}$−1). The object state may be represented by $x_j=[p_j^T\ v_j^T]^T$ that includes an object position $p_j$ and an object velocity $v_j$. The observation noise may correspond to observation noise $\rho$ described above, and be determined based on a distance between the point of sight of the character and the object position.

Operation 420 of determining the observation value and the observation noise may include determining the observation noise based on the point of sight of the character and the object position, and determining the observation value of the character with respect to the object based on the observation noise. For example, the operation 420 may include determining the observation value $z_j$ and the observation noise p of the character with respect to the object j based on Equation 1 described above.

Operation 430 may be estimating the object state in the vision system described herein, and include estimating the object state based on a POMDP. Operation 430 of estimating the object state may include defining a belief state of the object as a probability distribution over underlying states of the object based on the partial observation of the object and the observation noise, and updating the belief state of the object based on a Kalman filter. That is, as described above, by introducing a probability distribution of partially known object states, it is possible to convert the POMDP to a belief MDP. As described above, operation 430 may include defining the belief state b as the probability distribution of the object, and updating the belief state based on the belief MDP and the Kalman filter, and estimating a next belief state b'. Here, the updating of the belief state of the object based on the Kalman filter may include predicting the next belief state of the object j based on a transition matrix F of the Kalman filter, and updating the predicted next belief state of the object based on the partial observation of the object and a Kalman gain matrix $K_j$ of the Kalman filter that is associated with the object. The predicted next belief state of the object may correspond to a priori belief estimate $\bar{b}(x_j)=N(\bar{\mu}_j, \bar{\Sigma}_j)$ described above. The updated predicted next belief state of the object may correspond to a posteriori belief estimate $b'(x_j)=N(\mu'_j, \Sigma'_j)$, that is, the updating of the predicted next belief state may correspond to generating the belief update $b'(x_j)=N(\mu'_j, \Sigma'_j)$.

In operation 440, the character state may include the state of the joint included in the character and the eye pose of the character. The state of the joint of the character may include a joint position and a joint velocity. The control policy may include a character control vector that controls the character state, and the character control vector may correspond to $u=[u_{fb}{}^T \ e^T]^T$.

Operation 440 may correspond to trajectory optimization. That is, operation 440 may generating a locally optimal control policy for a window of certain size through DDP. Considering a cost, the generating of the control policy for the window may include generating an object state and a character state that correspond to each time step included in the window, and obtaining a character control vector based on a character state corresponding to a next time step. For example, the generating of the control policy may include, considering a cost preset in an object state and a character state that correspond to a first time step, determining an object state and a character state corresponding to a second time step which is a subsequent time step of the first time step, obtaining a character control vector corresponding to the first time step based on the character state corresponding to the second time step, and generating the character control vector for each of a preset number of time steps.

Here, the preset cost may include a cost associated with the reference motion and the state of the joint included in the character (which corresponds a cost for tracking), a cost associated with the character control vector (which corresponds to a cost for energy consumption), a cost associated with the belief state of the object (which corresponds to a cost for uncertainty), a cost associated with the eye pose of the character (which corresponds to a cost for constraints of an eye model), and a cost associated with a type of a task performed by the character (which corresponds to a cost for task).

Operation 450 may be controlling the character state based on the character control vector included in the control policy. That is, operation 450 may include converting a character state at a current time step to a character state at a next time step based on the character control vector. The character control vector may correspond to $u=[u_{fb}{}^T \ e^T]^T$. Operation 450 may include converting a joint state $x_{fb}$ corresponding to a current time step to a joint state $x'_{fb}=1$ ($x_{fb}$, $u_{fb}$) corresponding to a next time step based on a full-body character control vector $u_{fb}$. In addition, operation 450 may include converting an eye pose e of the character corresponding to the current time step to an eye pose of the character corresponding to the next time step based on e+h˙e.

The full-body modeling method may further include modeling the full-body character by visualizing the character state that changes based on the character control vector. The modeling of the full-body character by visualizing the character state may include generating a motion of the character based on articulated-body dynamics by considering an external force and the like in the visuomotor system described herein.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A full-body modeling method comprising:
 determining a point of sight of a character based on an eye pose of the character;
 determining an observation value and observation noise of the character with respect to at least one object based on the determined point of sight of the character;
 estimating a state of the object based on the determined observation value and the determined observation noise;
 generating a control policy of the character based on the estimated state of the object, a state of the character, and a reference motion of the character; and
 updating the state of the character based on the estimated state of the object and the generated control policy,
 wherein the state of the character comprises a state of at least one joint included in the character and the eye pose of the character,
 wherein the generating of the control policy comprises:
 determining a state of the object and a state of the character that correspond to a second time step which is a subsequent time step of a first time step based on a preset cost in a state of the object and a state of the character that correspond to the first time step;
 obtaining a character control vector corresponding to the first time step based on the state of the character corresponding to the second time step; and
 generating the character control vector for each of a preset number of time steps.

2. The full-body modeling method of claim 1, wherein the estimating of the state of the object comprises:
 estimating the state of the object based on a partially observable Markov decision process (POMDP).

3. The full-body modeling method of claim 1, wherein the estimating of the state of the object comprises:
 defining a belief state of the object as a probability distribution over underlying states of the object based on the observation value and the observation noise associated with the object; and
 updating the belief state of the object based on a Kalman filter.

4. The full-body modeling method of claim 3, wherein the updating of the belief state of the object comprises:
 predicting a next belief state of the object based on a transition matrix of the Kalman filter; and
 updating the predicted next belief state of the object based on the observation value associated with the object and a Kalman gain matrix of the Kalman filter that is associated with the object.

5. The full-body modeling method of claim 1, wherein the eye pose comprises at least one parameter including an azimuthal angle and a polar angle that indicate a gaze direction, and a focal length.

6. The full-body modeling method of claim 5, wherein the at least one parameter including the azimuthal angle, the polar angle, and the focal length is limited to a preset range.

7. The full-body modeling method of claim 1, wherein the preset cost comprises at least one of:
 a cost associated with the reference motion and the state of the joint included in the character;
 a cost associated with the character control vector;
 a cost associated with a belief state of the object;
 a cost associated with the eye pose of the character; or
 a cost associated with a type of a task performed by the character.

8. The full-body modeling method of claim 1, wherein the control policy comprises a character control vector that determines the state of the joint included in the character and the eye pose of the character.

9. The full-body modeling method of claim 1, wherein the determining of the point of sight of the character comprises:
 determining the point of sight of the character based on a position of a head joint of the character, a position of a midpoint between two eyes of the character, a focal length, a degree of rotation of the head joint, and a degree of rotation of the midpoint between the two eyes.

10. The full-body modeling method of claim 1, wherein the determining of the observation value and the observation noise of the character with respect to the object based on the point of sight of the character comprises:
 determining the observation noise based on the point of sight of the character and a position of the object; and
 determining the observation value of the character with respect to the object based on the position of the object and the observation noise.

11. The full-body modeling method of claim 1, further comprising:
 modeling a full-body character by visualizing the state of the character.

12. The full-body modeling method of claim 1, wherein the state of the joint comprises:
 a position of the joint and a velocity of the joint.

13. A non-transitory computer-readable storage medium storing instructions that, when executed by a processor, cause the processor to perform the full-body modeling method of claim 1.

14. A full-body modeling apparatus comprising:
 at least one processor configured to determine a point of sight of a character based on an eye pose of the character, determine an observation value and observation noise of the character with respect to at least one object based on the determined point of sight, estimate a state of the object based on the determined observation value and observation noise, generate a control policy of the character based on the estimated state of the object, a state of the character, and a reference motion of the character, and update the state of the character based on the estimated state of the object and the generated control policy; and
 a memory configured to store the state of the character, the reference motion of the character, and the state of the object,
 wherein the state of the character comprises a state of at least one joint included in the character, and the eye pose of the character,
 wherein, for the generating of the control policy, the processor is configured to:
 determine a state of the object and a state of the character that correspond to a second time step which is a subsequent time step of a first time step based on a preset cost in a state of the object and a state of the character that correspond to the first time step;

obtain a character control vector corresponding to the first time step based on the state of the character corresponding to the second time step; and generate the character control vector for each of a preset number of time steps.

15. The full-body modeling apparatus of claim 14, wherein, for the estimating of the state of the object, the processor is configured to:

estimate the state of the object based on a partially observable Markov decision process (POMDP).

16. The full-body modeling apparatus of claim 14, wherein, for the estimating of the state of the object, the processor is configured to:

define a belief state of the object as a probability distribution over underlying states of the object based on the observation value and the observation noise associated with the object;

predict a next belief state of the object based on a transition matrix of a Kalman filter; and update the predicted next belief state of the object based on the observation value associated with the object and a Kalman gain matrix of the Kalman filter that is associated with the object.

17. The full-body modeling apparatus of claim 14, wherein the eye pose comprises at least one parameter including an azimuthal angle and a polar angle that indicate a gaze direction, and a focal length, wherein the at least one parameter is limited to a preset range.

18. The full-body modeling apparatus of claim 14, wherein the preset cost comprises at least one of:

a cost associated with the reference motion and the state of the joint included in the character;

a cost associated with the character control vector;

a cost associated with a belief state of the object;

a cost associated with the eye pose of the character; or a cost associated with a type of a task performed by the character.

19. The full-body modeling apparatus of claim 14, wherein the processor is configured to:

model a full-body character by visualizing the state of the character.

* * * * *